Patented Oct. 24, 1950

2,527,426

UNITED STATES PATENT OFFICE 2,527,426

NITRO - DISTYRYLBENZENE - DISULFONIC ACIDS AND A METHOD OF MAKING SAME

Ernst Keller and Reinhard Zweidler, Basel, Switzerland, assignors to J. R. Geigy A. G., Basel, Switzerland, a Swiss firm No Drawing. Application July 11, 1949, Serial No. 104,135. In Switzerland July 23, 1948

4 Claims. (Cl. 260—505)

The present invention is concerned with the manufacture of new nitro-distyrylbenzene-disulfonic acids and with these new compounds themselves. More precisely, it involves the manufacture of aromatic sulfonic acids of 1.4-distyrylbenzene where one styryl group in the para position of the benzene ring contains a nitro group, or, to be exact, the manufacture of 4-nitro-4'-styryl-stilbene-2.2'-disulfonic acids.

It is well known that 4.4'-dinitro-stilbene-2.2'-disulfonic acid has attained considerable practical importance as an intermediate in the manufacture of substantive azo dyestuffs and of textile auxiliaries. Its corresponding derivatives have an outstandingly high degree of affinity for cellulose fibres, a property which is doubtless connected with the system of conjugated double bonds present in the stilbene component. A stilbene-disulfonic acid analogous to 4.4'-dinitrostilbene-2.2'-disulfonic acid but having one of the nitro groups replaced by styryl group, thus extending the resonance system, has so far been unknown. The present invention involves such a compound, which promises to become an interesting intermediate in the manufacture of dyestuffs and textile auxiliaries. It is true that 1.4-distyrylbenzene compounds derived from terephthalaldehyde and 2 molecular proportions of 2.4-dinitrotoluene by Thiele and Escales (Ber. 34, 2843) have already been prepared and it has been shown repeatedly that in this reaction one of the nitro groups of the toluene component can be replaced by other negative groups, e. g., by the nitrile group. On the other hand, until now no success had been obtained with this method in the preparation of sulfonated nitrostilbene compounds which, as mentioned above, are particularly interesting for technical purposes. Furthermore, when the nitro compounds preparable by Thiele's method are sulfonated, then the result is not replacement of hydrogen in a benzene ring with the formation of aromatic sulfonic acids, for the sulfonic acid adds on to the ethylene double bond thus cancelling the characteristic conjugated double bond resonance system. Consequently, direct sulfonation of nitrostilbene compounds gives rise only to sulfonic acids of no technical interest.

It has now been discovered that the 4-nitro-4'-styrylstilbene-2.2'-disulfonic acids can be prepared in satisfactory yield by employing a method known per se (cf. the Meerwein synthesis of stilbene—J. Prakt. Chemie (2), 152, 256 (1939)), comprising the reaction between diazotized 4-nitro-4'-amino-stilbene-2.2'-disulfonic acid and cinnamic acid or its derivatives substituted in the benzene ring, insofar as substituents like the hydroxy and amino groups, which favour the formation of azo- and diazoamino compounds, are not present in the free form, but bound, e. g., as acetyl derivatives. The corresponding 4 - nitro - 4'-styryl-stilbene-2.2'-disulfonic acids are formed in this reaction, nitrogen and carbon dioxide being split off. The benzene ring of the styryl group may contain the usual substituents, and groups already present may be saponified, if required. The relative ease with which the Meerwein reaction takes place with the diazo compound according to the invention is surprising in view of the fact that by no means each and every substituted aromatic diazo compound reacts with cinnamic acid according to the Meerwein reaction so as to give a usable yield and since heretofore no aromatic diazo-disulfonic acid derivatives have been used in this reaction, as far as is known.

The new 4-nitro-4'-styryl-stilbene-2.2'-disulfonic acids correspond to the general formula

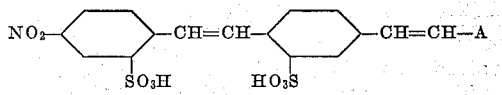

wherein A stands for a substituted or unsubstituted aromatic radical of the benzene series.

According to the solubility of the components, the diazo compound can be reacted with the cinnamic acids using water, water-acetone, acetone, pyridine, dioxan, ethanol, glacial acetic acid, etc., as solvent. It is convenient to carry out the reaction in the presence of catalytically active metals or metal salts, e. g., cupric salts and buffer salts. As mentioned above, apart from cinnamic acid itself, derivatives where the phenyl radical contains methyl, alkoxy, nitro, acylamino, acyloxy, sulfonic acid groups, halogens and so on may also be used in the reaction with the diazo compound. Although substituents favouring azo coupling must be absent from the cinnamic acid component, since they would interfere with the reaction, this does not mean that they may not be present in the final product having the above general formula. Thus, in the phenyl radical A an amino group may be produced by the saponification of an acylamino group or a hydroxyl group by the saponification of an acetoxy group.

The new 4-nitro-4'-styryl-stilbene-2.2'-disulfonic acids, which may also be termed 1-(4'-nitro-styryl)-4-styryl-benzene-2.2'-disulfonic acids, are valuable intermediates in the manufacture of dyestuffs and textile auxiliaries.

The following examples illustrate the invention without restricting it. Parts are parts by weight and temperatures in degrees centigrade. The relationship of parts by weight to parts by volume is that of kilograms to litres.

*Example 1*

First 25 parts of crystalline sodium acetate and then 40 parts of diazotized 4-nitro-4'-aminostilbene-2.2'-disulfonic acid in 500 parts of water are added to 14.8 parts of cinnamic acid dissolved in 600 parts of acetone. An aqueous solution of 12 parts of crystalline cupric chloride is added at 36–38°. Reaction then sets in, with evolution of nitrogen. After the diazo compound has all disappeared the acetone is distilled off, the product of the reaction precipitated by adding concentrated hydrochloric acid until the solution reacts acid to Congo red and separated at room temperature. The cinnamic acid contained in the precipitate which has not taken part in the reaction is removed by extracting with ether or benzene. The residue is dissolved in boiling water, while maintaining a weakly alkaline reaction, the solution is filtered to remove impurities if necessary and the disodium salt of 4-nitro-4'-styryl-stilbene-2.2'-disulfonic acid is allowed to crystallize out.

In the dry state this product is a red-brown powder the aqueous solutions of which are yellowish. The compound dissolves in concentrated sulfuric acid with weak green-yellow color. Diluted aqueous solutions show a greenish fluorescence in ultraviolet light. An analysis of the product confirms the presence of one nitro group to two ethylene linkages.

*Example 2*

14.8 parts of cinnamic acid are dissolved in 600 parts of pyridine. Next 40 parts of diazotized 4-nitro-4'-amino-stilbene-2.2'-disulfonic acid in 500 parts of water and 12 parts of cupric chloride crystals in 20 parts of water are added at a temperature of 32–35°. After gas has ceased to be evolved 20 parts of soda ash are added and the pyridine is removed by steam distillation. The purification of the 4-nitro-4'-styryl-stilbene-2.2'-disulfonic acid can suitably be carried out by the method given in Example 1. The product shows the same properties.

*Example 3*

40 parts of 4-nitro-4'-amino-stilbene-2.2'-disulfonic acid are diazotized and the 4-diazo-4'-nitro-stilbene-2.2'-disulfonic acid obtained is salted out and isolated.

The diazo compound is mixed into 200 parts of glacial acetic acid, containing in solution 24.0 parts of cinnamic acid and 60 parts of crystalline sodium acetate as buffer as well as 12 parts of crystalline cupric chloride, while stirring well. Between 60–70° the reaction sets in, with splitting off of nitrogen and carbon dioxide. After the diazo compound has all gone, 800 parts of hot water and 25 parts of concentrated hydrochloric acid are added, thus giving a clear, reddish brown solution. At 35–40° the precipitated cinnamic acid is filtered off and by adding 20% of common salt to the filtrate the 4-nitro-4'-styryl-stilbene-2.2'-disulfonic acid is salted out and isolated.

The substance is fairly pure for most purposes of application, it can be recrystallised from water if necessary and small amounts of cinnamic acid may be removed by extraction. The substance has the same properties as the products described in Examples 1 and 2.

*Example 4*

16.2 parts of p-methyl-cinnamic acid are dissolved in 200 parts of glacial acetic acid, 25 parts crystalline sodium acetate added, followed by 40 parts of diazotized 4-nitro-4'-amino-stilbene-2.2'-disulfonic acid in 500 parts of water, and a solution of 12 parts of crystalline cupric chloride in 20 parts of water. After complete reaction, the product is isolated by the method described in Example 3 and purified.

The dry 4-nitro-4'-(4''-methyl-styryl)-stilbene-2.2'-disulfonic acid is a reddish-brown powder, soluble in water with a yellowish color. The diluted aqueous solutions fluoresce in ultraviolet light. The product dissolves in concentrated sulfuric acid with a green-yellow color.

*Example 5*

22.8 parts of p-sulfocinnamic acid are dissolved in 250 parts of water under neutral conditions. 40 parts of diazotized 4-nitro-4'-amino-stilbene-2.2'-disulfonic acid in 500 parts of water are added, followed by 25 parts of crystalline sodium acetate and 12 parts of crystalline cupric chloride in 20 parts of water. After the diazo compound has all gone the copper ions are precipitated as copper sulfide by adding sodium sulfide and 25% of common salt are added to the filtered solution in order to salt out the nitro compound. For most purposes the 4-nitro-4'-(4''-sulfostyryl)-stilbene-2.2'-disulfonic acid need not be purified further. If necessary, it may be recrystallised from water. When dry it is a red-brown powder, soluble in water with a yellowish color and in concentrated sulfuric acid with a greenish yellow color.

*Example 6*

40.0 parts of 4-nitro-4'-amino-stilbene-2.2'-disulfonic acid are diazotized, the diazo compound is then salted out and isolated. The wet product is brought into a solution of 18.3 parts of o-chlorocinnamic acid in 200 parts of glacial acetic acid with 50 parts of crystalline sodium acetate and 12 parts of crystalline cupric chloride, while stirring well, at a temperature of 60–70°. Stirring is continued at 60–70° until the diazo compound has all gone. The product is isolated and purified by the method described in Example 3. The dry 4-nitro-4'-(2''-chlorostyryl)-stilbene-2.2'-disulfonic acid is a red-brown powder which dissolves in water with a yellowish color.

The following are additional examples of the invention which are prepared by methods substantially similar to those heretofore given:

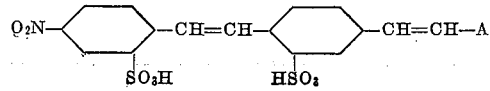

| Example No. | A | color of the dry product |
|---|---|---|
| 7 |  | brown. |
| 8 | 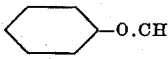 | reddish-brown. |
| 9 | 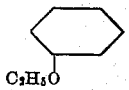 | red-brown. |
| 10 | 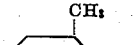 | reddish-brown. |
| 11 |  | brown-red. |
| 12 | 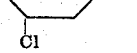 | reddish-brown. |
| 13 |  | reddish-brown. |

We claim as new compounds:
1. A 4-nitro-4'-styryl-stilbene-2.2'-disulfonic acid of the formula

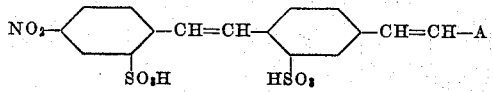

wherein A represents a mononuclear aromatic radical of the benzene series.

2. The 4-nitro-4'-styryl-stilbene-2.2'-disulfonic acid of the formula

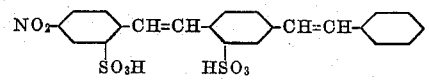

3. The 4-nitro-4'-(4''methyl-styryl)-stilbene-2.2'-disulfonic acid of the formula

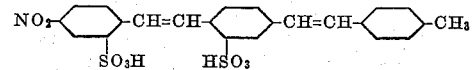

4. The 4-nitro-4'-(4''-sulfo-styryl)-stilbene-2.2'-disulfonic acid of the formula

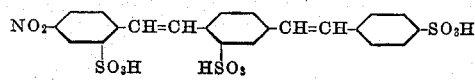

ERNST KELLER.
REINHARD ZWEIDLER.

REFERENCES CITED

The following references are of record in the file of this patent:

UNITED STATES PATENTS

| Number | Name | Date |
|---|---|---|
| 2,195,790 | Schmid | Apr. 2, 1940 |

FOREIGN PATENTS

| Number | Country | Date |
|---|---|---|
| 240,125 | Switzerland | Nov. 30, 1945 |

OTHER REFERENCES

Meerwein, J. Prakt., Chemie (2), vol. 152, pp. 256 (1939).

Thille and Escales, Ber. vol. 34, page 2843.